United States Patent
Nagai et al.

(10) Patent No.: US 9,765,709 B2
(45) Date of Patent: Sep. 19, 2017

(54) CONTROL APPARATUS FOR DETERMINING AN ABSOLUTE PRESSURE CORRECTION IN AN INTERNAL COMBUSTION ENGINE

(71) Applicant: TOYOTA JIDOSHA KABUSHIKI KAISHA, Toyoya-shi, Aichi-ken (JP)

(72) Inventors: Masakatsu Nagai, Hiratsuka (JP); Hiromichi Yasuda, Gotemba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 41 days.

(21) Appl. No.: 14/441,258

(22) PCT Filed: Jan. 17, 2014

(86) PCT No.: PCT/JP2014/050806
§ 371 (c)(1),
(2) Date: May 7, 2015

(87) PCT Pub. No.: WO2014/115654
PCT Pub. Date: Jul. 31, 2014

(65) Prior Publication Data
US 2015/0315993 A1  Nov. 5, 2015

(30) Foreign Application Priority Data
Jan. 24, 2013 (JP) ................. 2013-010951

(51) Int. Cl.
F02D 35/02 (2006.01)
G01M 15/08 (2006.01)
F02D 41/00 (2006.01)

(52) U.S. Cl.
CPC ........ *F02D 35/023* (2013.01); *F02D 35/024* (2013.01); *G01M 15/08* (2013.01);
(Continued)

(58) Field of Classification Search
CPC ..... F02D 35/023; F02D 35/024; G01M 15/08
(Continued)

(56) References Cited

U.S. PATENT DOCUMENTS 7,367,318 B2 * 5/2008 Moriya ............... F02D 13/0203
123/435
7,693,646 B2 * 4/2010 Moriya ................. F02D 35/023
123/435

(Continued)

FOREIGN PATENT DOCUMENTS

DE   112010005992 T5   8/2013
JP   2009-275573 A    11/2009
(Continued)

*Primary Examiner* — Erick Solis
*Assistant Examiner* — Robert Werner
(74) *Attorney, Agent, or Firm* — Andrews Kurth Kenyon LLP

(57) ABSTRACT

An in-cylinder pressure sensor detecting in-cylinder pressure is provided. A first crank angle and a second crank angle in the adiabatic compression stroke are set using an in-cylinder-pressure-maximum crank angle as a baseline, and an absolute pressure correction value is calculated using the in-cylinder pressure and in-cylinder volume at each of these crank angles. A crank angle advanced from the in-cylinder-pressure-maximum crank angle is set as the second crank angle in a manner so as to be a timing in the adiabatic compression stroke on the retard side with respect to the spark timing, and is used for the absolute pressure correction.

7 Claims, 12 Drawing Sheets

(52) U.S. Cl.
CPC .......... *F02D 35/028* (2013.01); *F02D 41/009* (2013.01); *F02D 2200/0406* (2013.01); *F02D 2200/0408* (2013.01)

(58) Field of Classification Search
USPC ....... 73/114.16; 123/406.22, 406.41, 406.42, 123/435
See application file for complete search history.

(56) References Cited

U.S. PATENT DOCUMENTS

| | | | | |
|---|---|---|---|---|
| 7,861,690 | B2* | 1/2011 | Moriya | ................. F02D 35/023 123/406.41 |
| 8,651,088 | B2* | 2/2014 | Urano | ................. F02D 41/0002 123/406.41 |
| 8,831,856 | B2* | 9/2014 | Yasuda | ................. F02D 35/028 123/435 |
| 8,862,366 | B2* | 10/2014 | Yasuda | ................... F02D 35/02 123/435 |
| 2008/0319633 | A1* | 12/2008 | Moriya | ................. F02D 35/023 701/103 |
| 2013/0226434 | A1* | 8/2013 | Urano | ................. F02D 13/0219 701/102 |
| 2014/0052362 | A1* | 2/2014 | Barth | .................... F02D 41/008 701/104 |

FOREIGN PATENT DOCUMENTS

| | | |
|---|---|---|
| JP | 2010-174706 A | 8/2010 |
| JP | 2011157850 A | 8/2011 |
| WO | 2012/063363 A1 | 5/2012 |

\* cited by examiner

[Fig. 1]
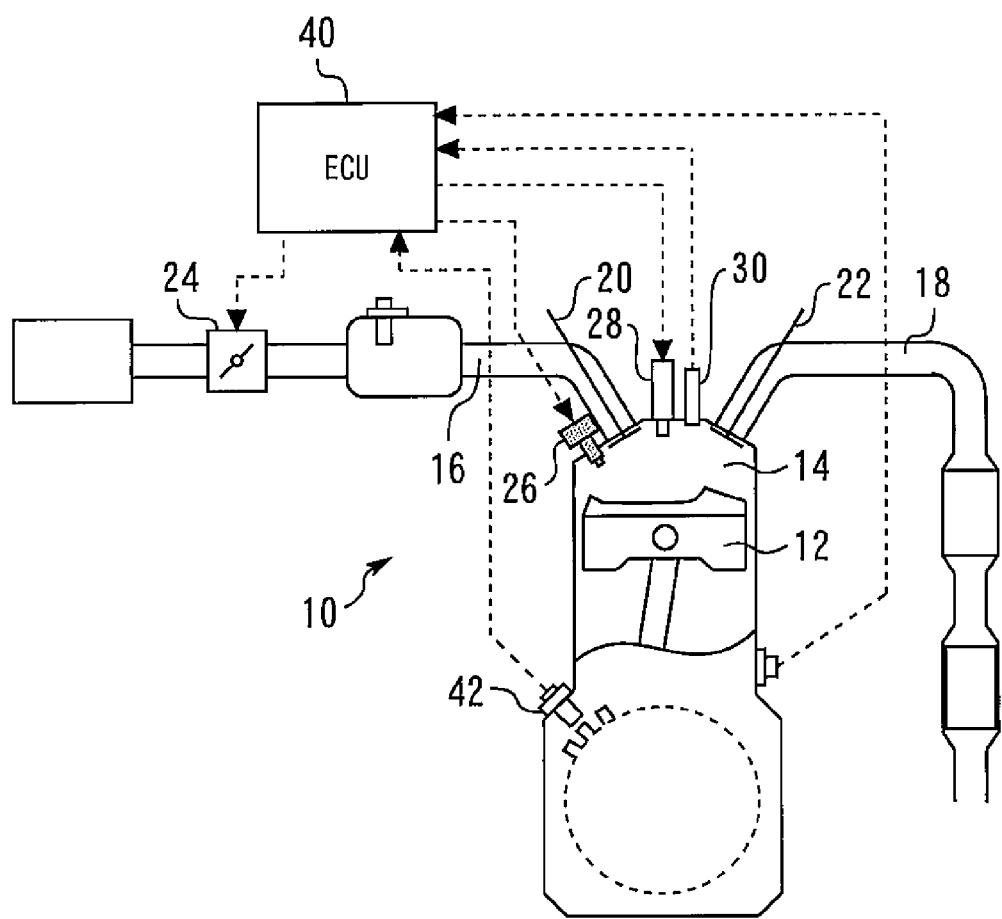

[Fig. 2(A)]
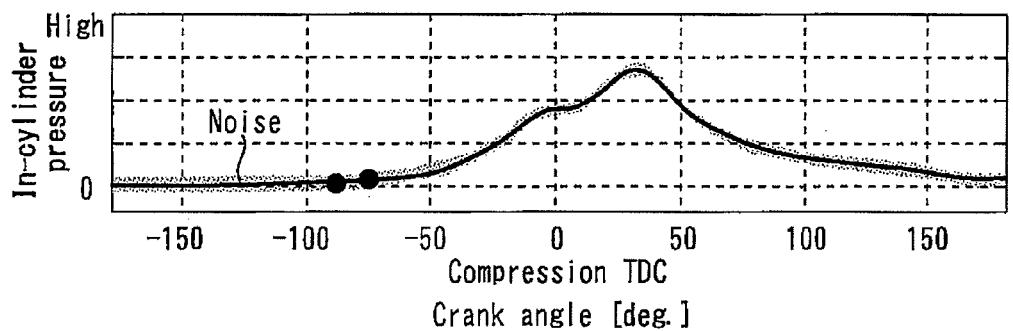
[Fig. 2(B)]
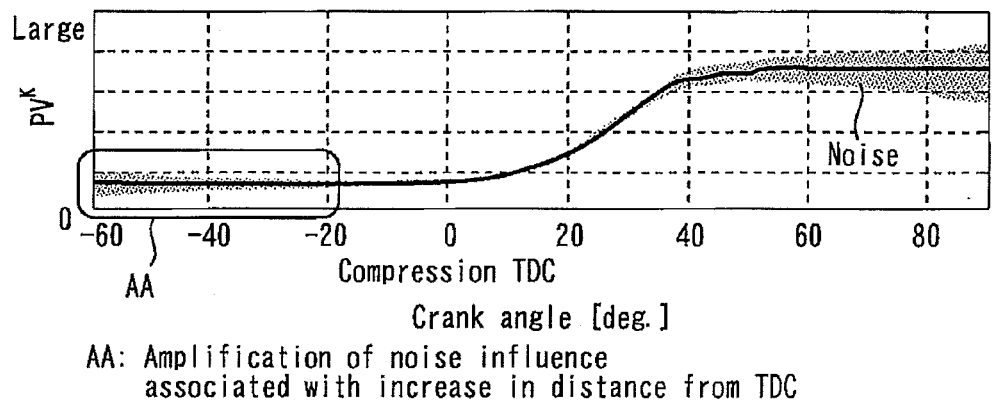
AA: Amplification of noise influence associated with increase in distance from TDC
[Fig. 2(C)]
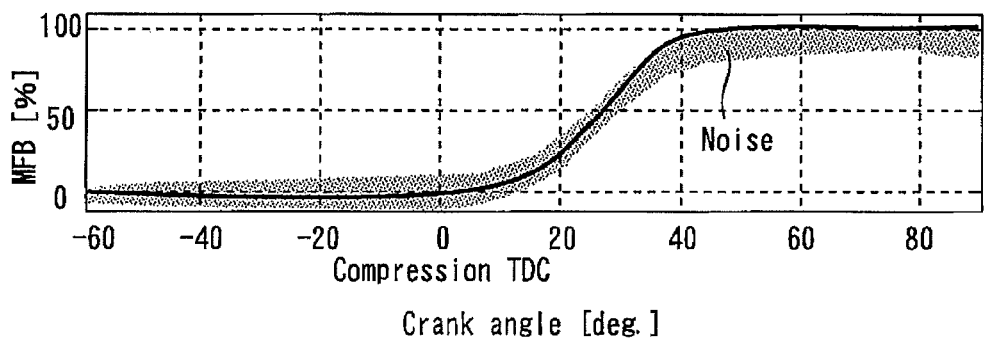

[Fig. 3(A)]
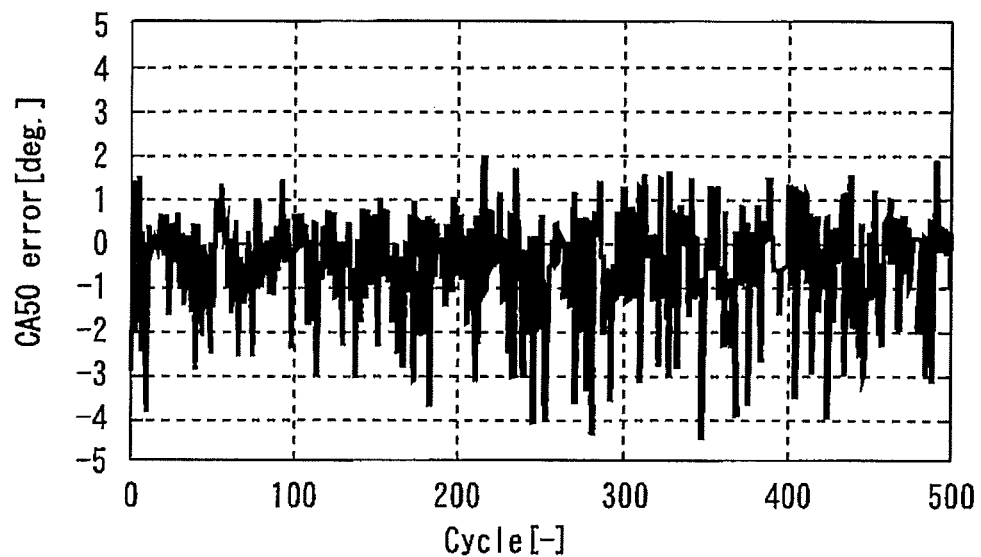
[Fig. 3(B)]
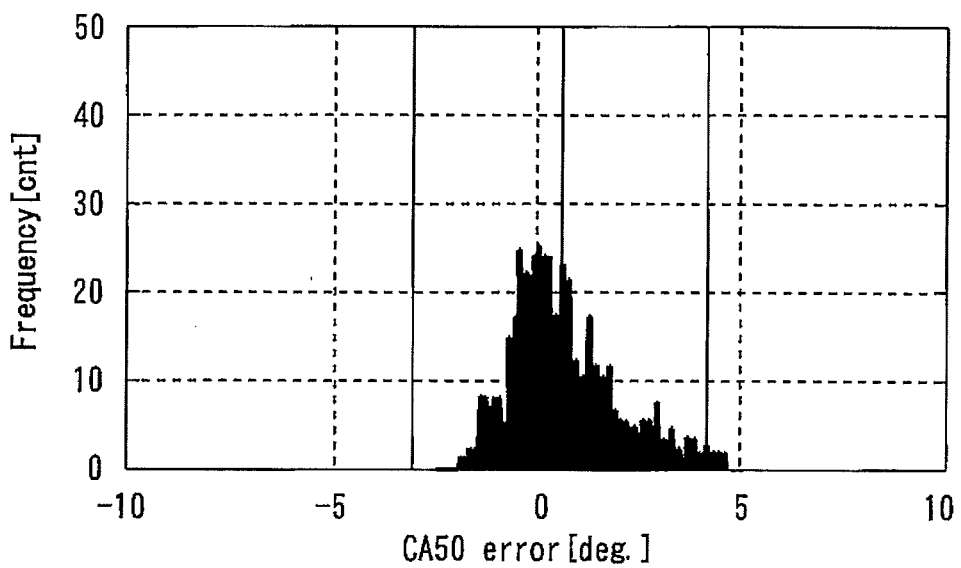

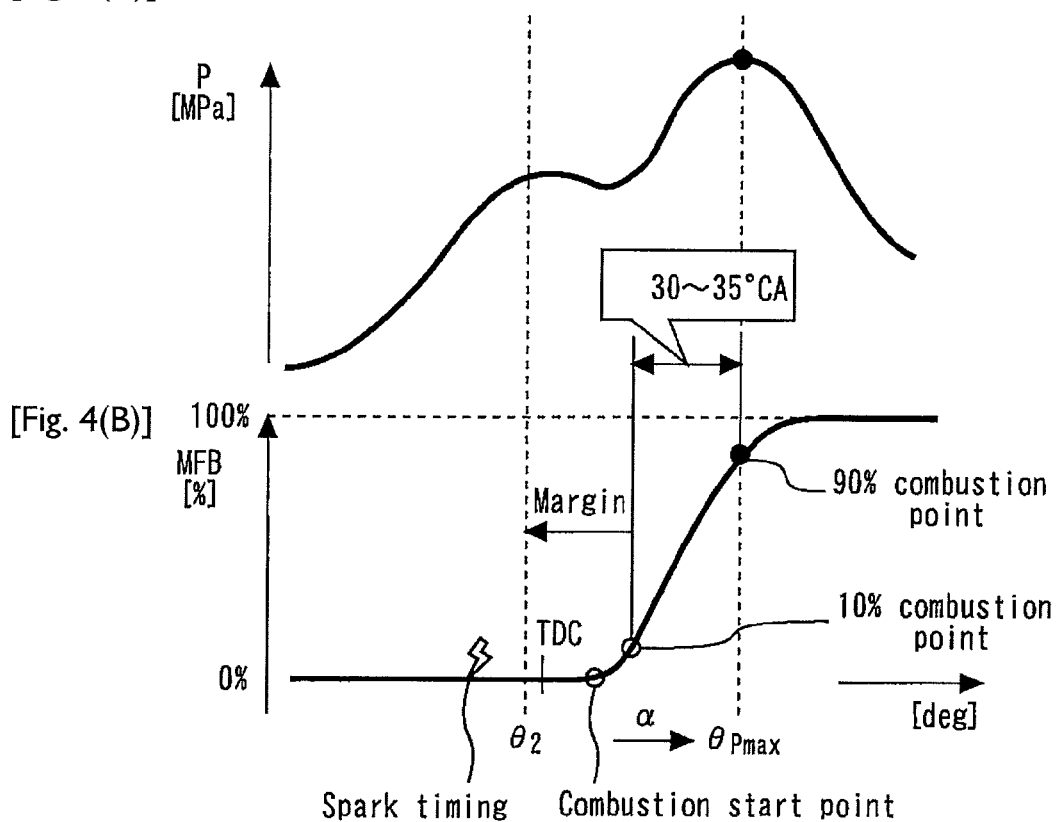

[Fig. 5]
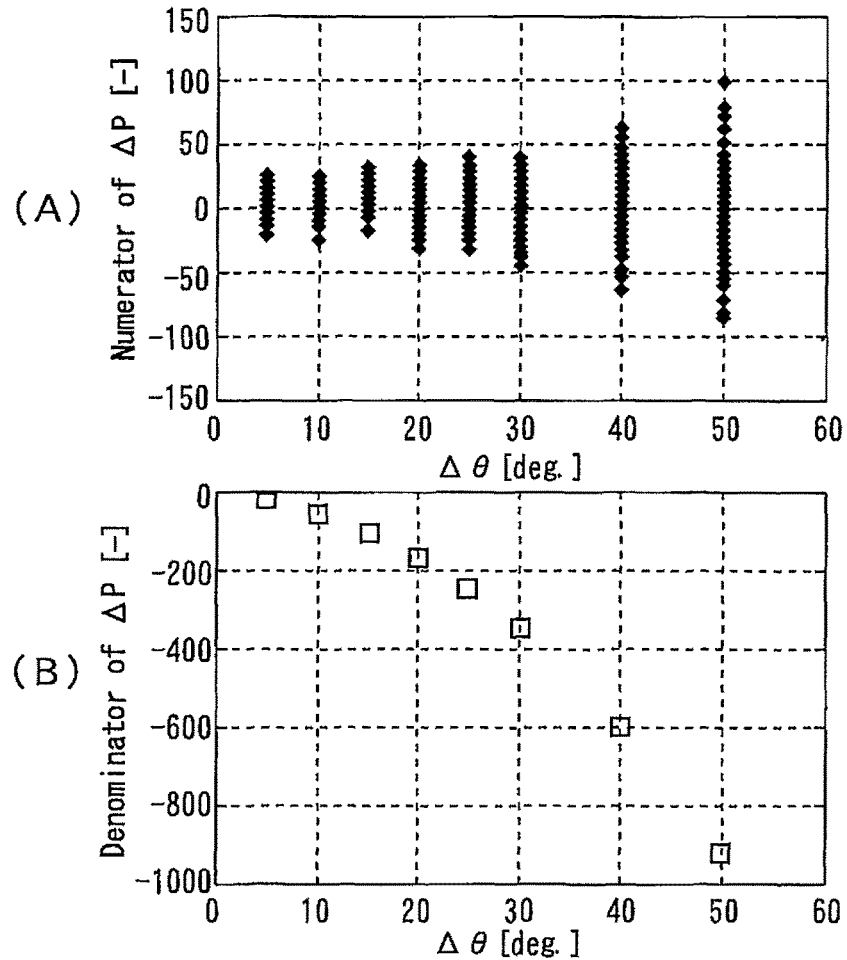
[Fig. 6]
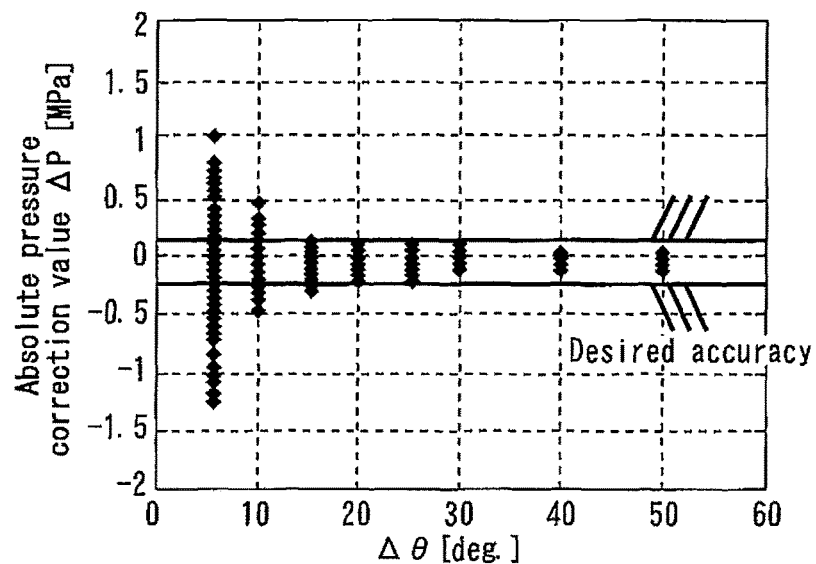

[Fig. 7]
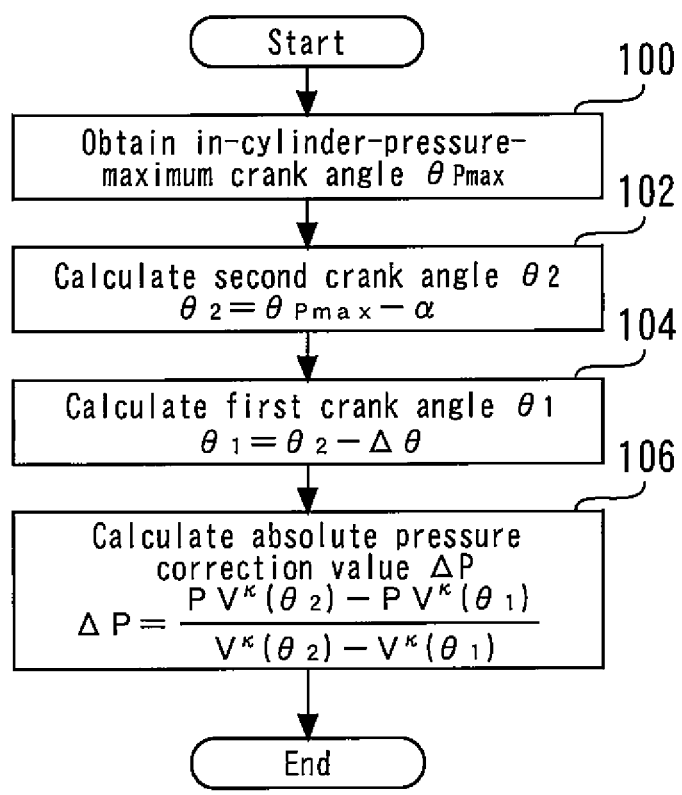

[Fig. 8(A)]
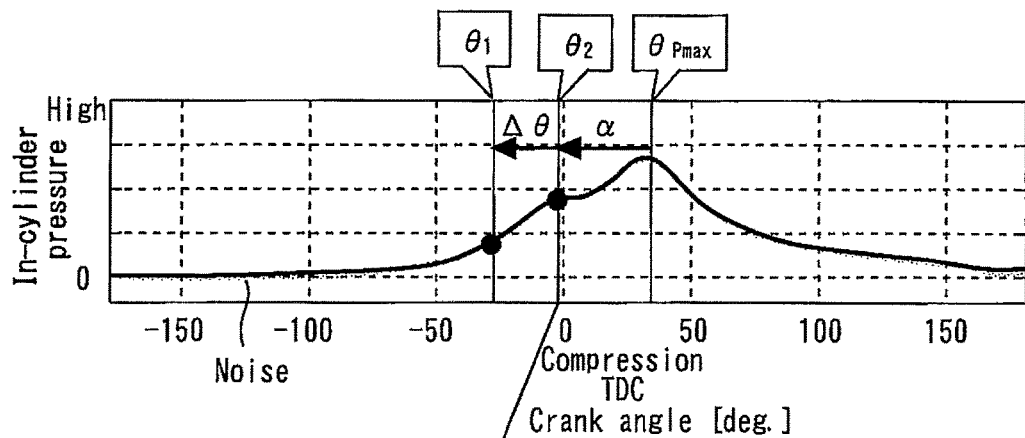
[Fig. 8(B)]
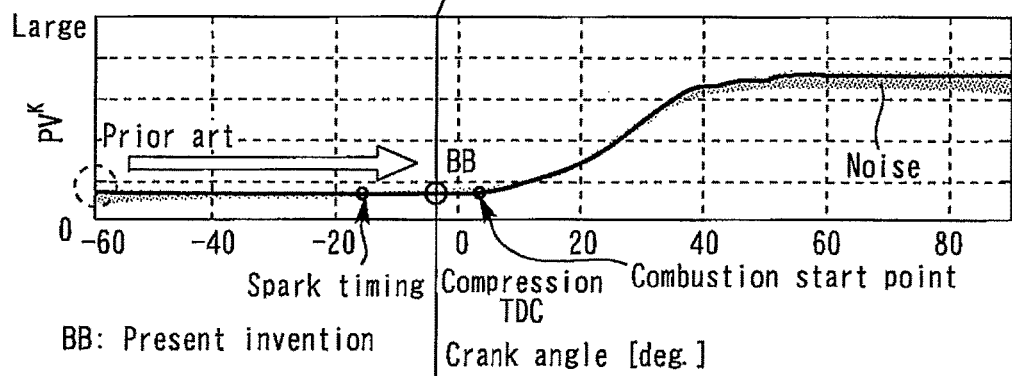
BB: Present invention
[Fig. 8(C)]
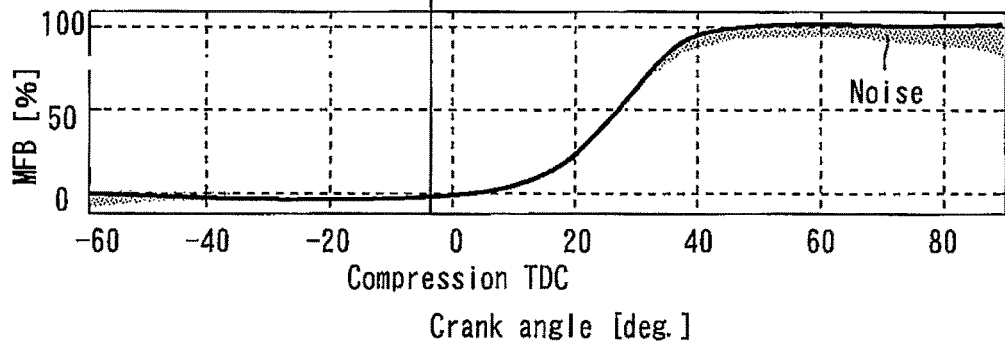

[Fig. 9(A)]
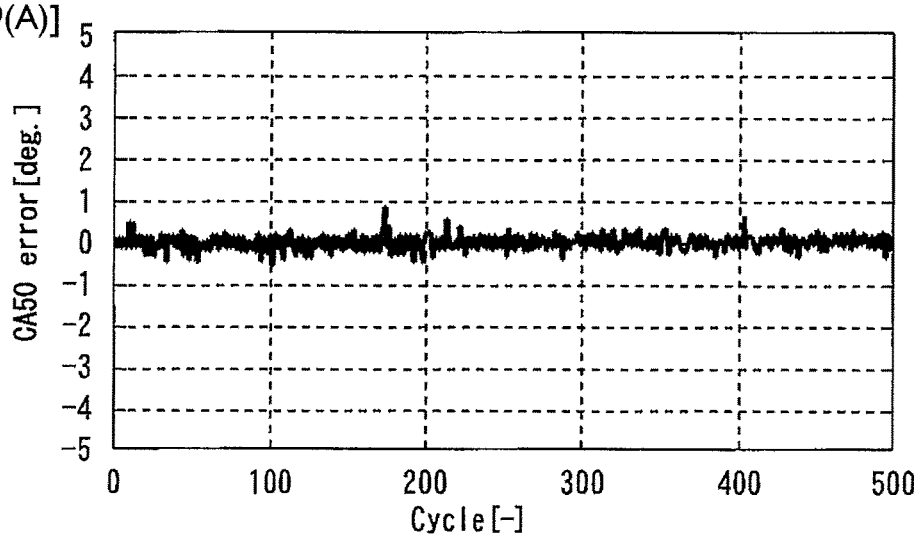
[Fig. 9(B)]
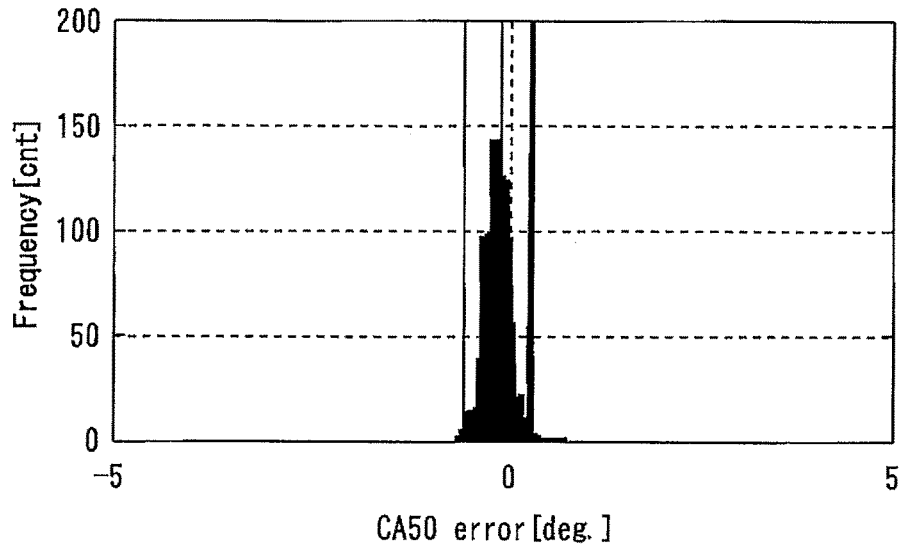
[Fig. 10]
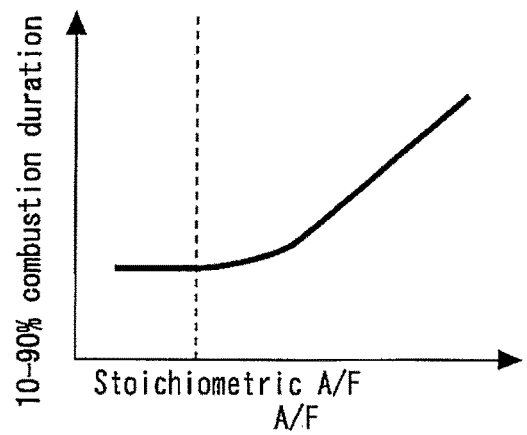

[Fig. 11]
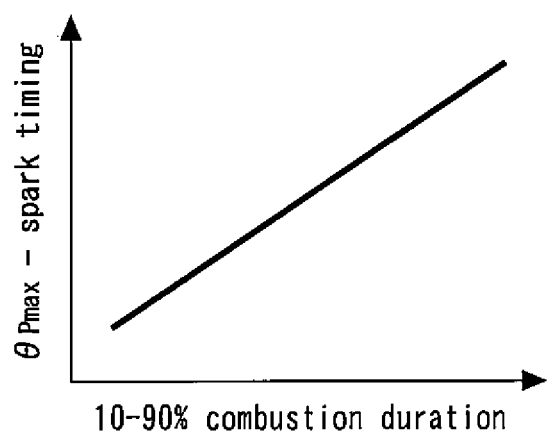
[Fig. 12]
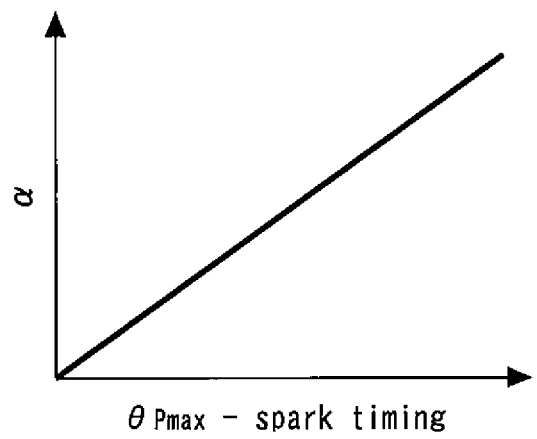

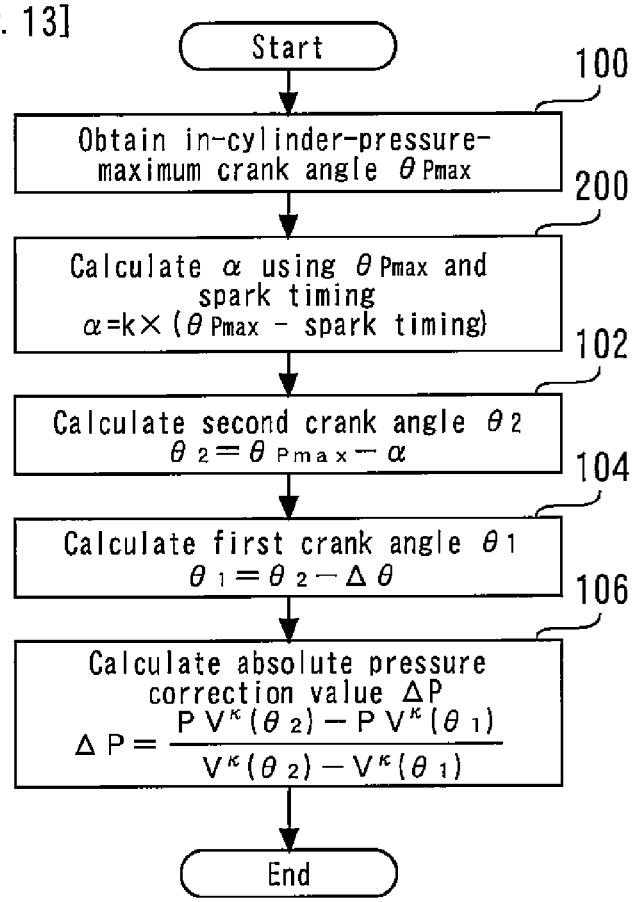
[Fig. 13]
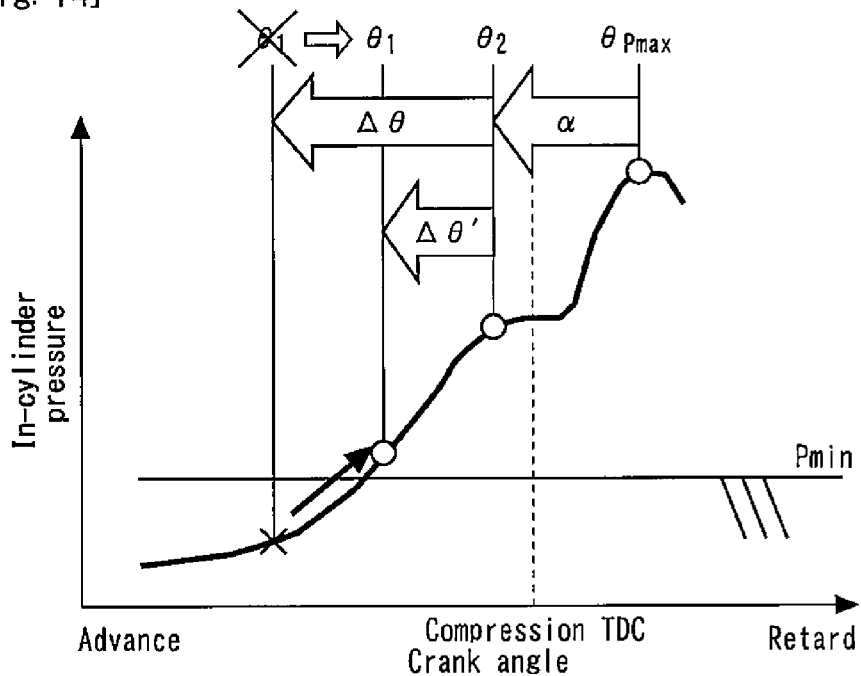
[Fig. 14]

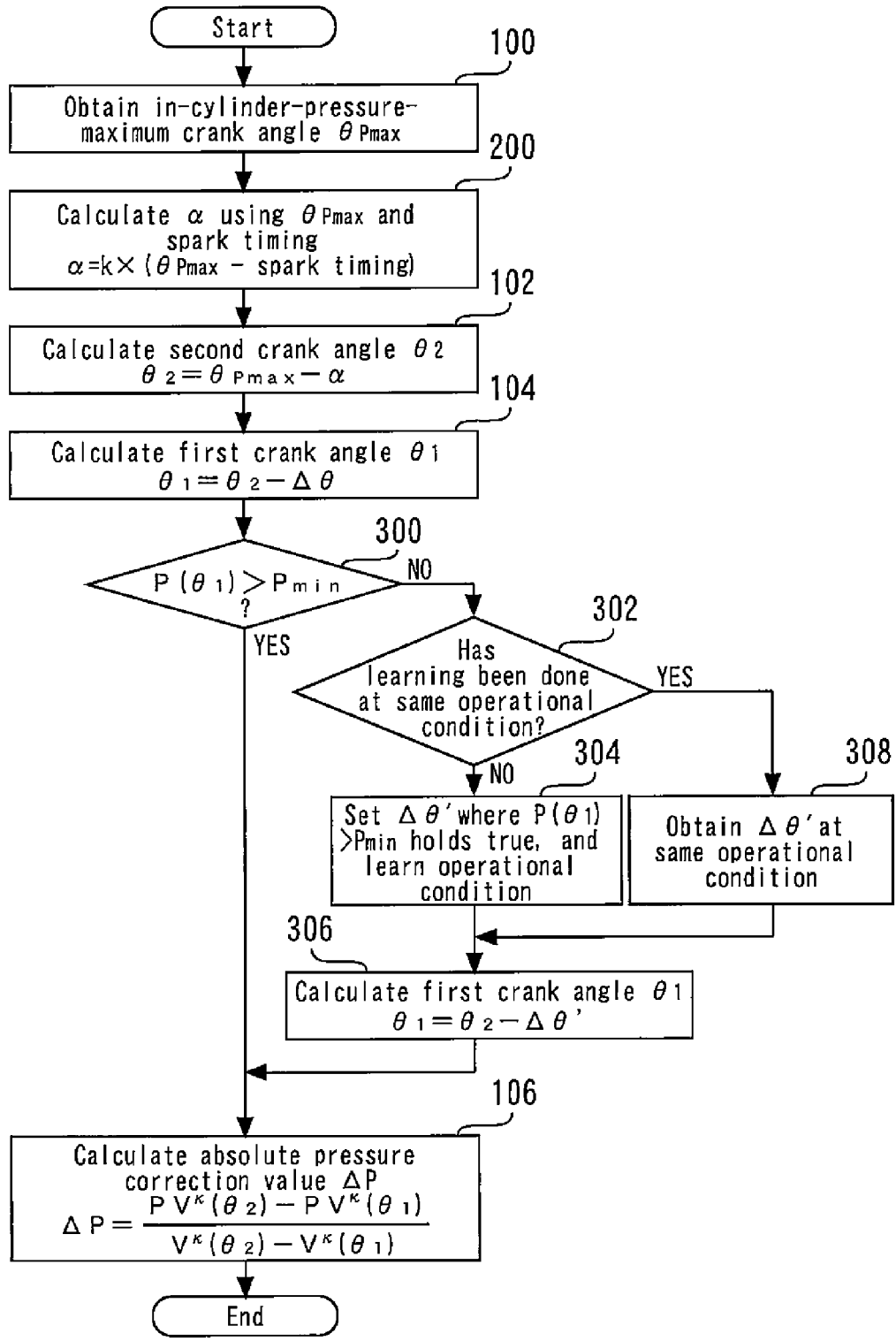
[Fig. 15]

[Fig. 16]
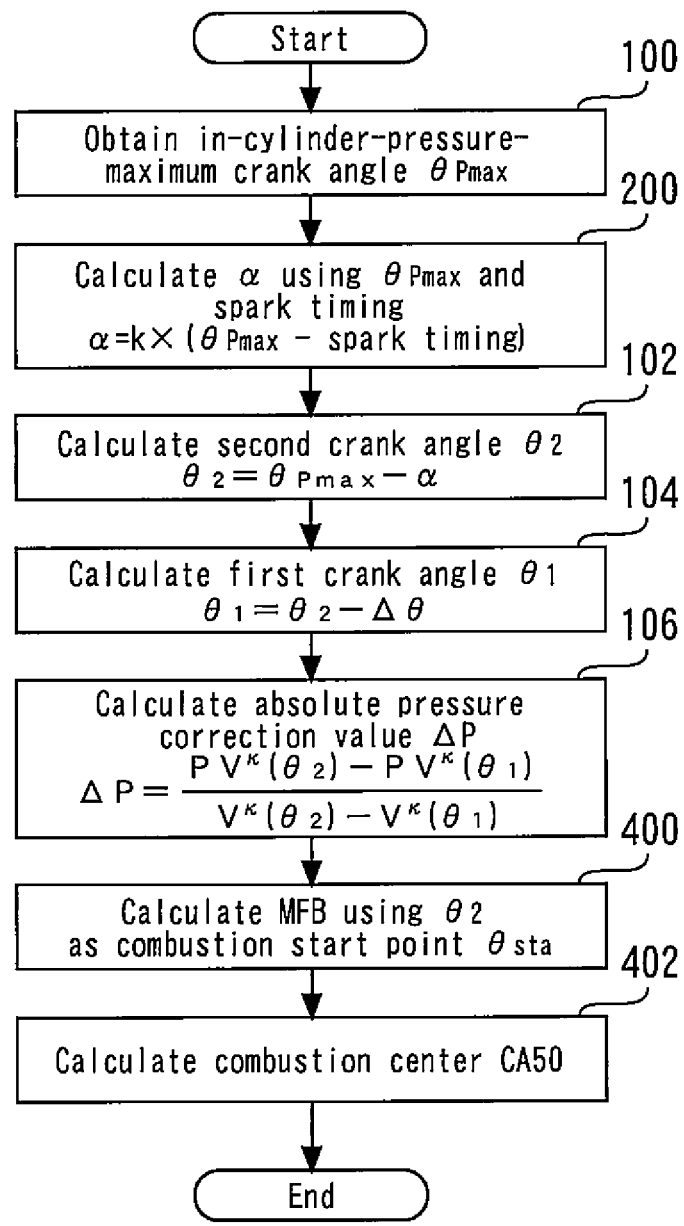

CONTROL APPARATUS FOR DETERMINING AN ABSOLUTE PRESSURE CORRECTION IN AN INTERNAL COMBUSTION ENGINE

CROSS-REFERENCE TO RELATED APPLICATIONS

This is a national phase application based on the PCT International Patent Application No. PCT/JP2014/050806 filed Jan. 17, 2014, claiming priority to Japanese Patent Application No. 2013-010951 filed Jan. 24, 2013, the entire contents of both of which are incorporated herein by reference.

TECHNICAL FIELD

The present invention relates to a control apparatus for an internal combustion engine, and more particular to a control apparatus for an internal combustion engine that is suitable for an apparatus that executes various types of engine controls with use of detection values of an in-cylinder pressure sensor.

BACKGROUND ART

So far, for example, Patent Literature 1 discloses a control apparatus for an internal combustion engine that includes an in-cylinder pressure sensor. Since detection values of the in-cylinder pressure sensor are gauge pressure relative to atmosphere pressure, it is generally required to perform absolute pressure correction. Accordingly, the aforementioned conventional control apparatus utilizes Poisson's equation to calculate an absolute pressure correction value based on in-cylinder pressure and in-cylinder volume at each of two crank angles in the adiabatic compression stroke from the closing timing of an intake valve to a spark timing and the ratio of specific heat (that is to say, based on a parameter $PV^\kappa$).

Including the above described literature, the applicant is aware of the following literature as related art of the present invention.

CITATION LIST

Patent Literature

Patent Literature 1: International Publication No. 2012/063363
Patent Literature 2: Japanese Laid-open Patent Application Publication No. 2009-275573
Patent Literature 3: Japanese Laid-open Patent Application Publication No. 2010-174706

SUMMARY OF INVENTION

Technical Problem

In a conventional technique to calculate the absolute pressure correction value using in-cylinder pressure and in-cylinder volume at each of two crank angles in the adiabatic compression stroke (more specifically, for example, using the parameter $PV^\kappa$ as in the Patent Literature 1, or using heat release amount Q that is calculated based on the detection values of an in-cylinder pressure sensor), crank angles (fixed values) at such timings that can avoid the influence of the closing timing of an intake valve and the like in all operational conditions have been used as the two crank angles, in order to simplify the calculation processing.

Noise may be superimposed on, for example, an in-cylinder pressure sensor, an ECU and wire harnesses that connect the in-cylinder pressure sensor with the ECU. When such electro-magnetic noise is superimposed on the detection values of the in-cylinder pressure sensor, an error occurs in the calculation of the absolute pressure correction value using the above described method. The influence of this error increases with an increase in the distance from the compression top dead center. However, two crank angles at commonly-used timings in the conventional calculation of the absolute pressure correction value were far away from the compression top dead center. Therefore, there is a problem that a large error may occur when performing the absolute pressure correction using such two crank angles.

The present invention has been made to solve the problem as described above, and has its object to provide a control apparatus for an internal combustion engine that is configured to perform absolute pressure correction that can efficiently suppress the influence of noise with respect to in-cylinder pressure detected by an in-cylinder pressure sensor, without incurring an increase in cost, a number of adaptable processes, and an increase in calculation processing load.

Solution to Problem

A first aspect of the present invention is a control apparatus for an internal combustion engine, which includes:
an in-cylinder pressure sensor detecting in-cylinder pressure;
obtaining means for obtaining an in-cylinder-pressure-maximum crank angle when in-cylinder pressure detected by the in-cylinder pressure sensor becomes maximum during a combustion duration; and
absolute pressure correction means for setting, using the in-cylinder-pressure-maximum crank angle as a baseline, a first crank angle and a second crank angle on a retard side of the first crank angle in an adiabatic compression stroke from a closing timing of an intake valve until a start of combustion and, based on in-cylinder pressure and in-cylinder volume at each of the first crank angle and the second crank angle, performing absolute correction for the in-cylinder pressure detected by the in-cylinder pressure sensor,
wherein the second crank angle that is set by the absolute pressure correction means is a crank angle advanced with respect to the in-cylinder-pressure-maximum crank angle in a manner so as to be a timing in the adiabatic compression stroke on a retard side with respect to the spark timing, and is used for the absolute correction.

A second aspect of the present invention is the control apparatus for an internal combustion engine according to the first aspect of the present invention,
wherein the second crank angle that is set by the absolute pressure correction means is a crank angle advanced with respect to the in-cylinder-pressure-maximum crank angle by a first crank angle interval, and the first crank angle that is set by the absolute pressure correction means is a crank angle advanced with respect to the second crank angle by a second crank angle interval.

A third aspect of the present invention is the control apparatus for an internal combustion engine according to the first aspect of the present invention,
wherein the first crank angle that is set by the absolute pressure correction means is a crank angle advanced with respect to the in-cylinder-pressure-maximum crank angle by a third crank angle interval, and the second crank angle that is set by the absolute pressure correction means is a crank angle retarded with respect to the first crank angle by a second crank angle interval.

A fourth aspect of the present invention is the control apparatus for an internal combustion engine according to the second aspect of the present invention, wherein the absolute pressure correction means sets the first crank angle interval based on a difference between the in-cylinder-pressure-maximum crank angle and a spark timing.

A fifth aspect of the present invention is the control apparatus for an internal combustion engine according to any one of the first to fourth aspects of the present invention, wherein the second crank angle that is set by the absolute pressure correction means is a crank angle near a combustion start point.

A sixth aspect of the present invention is the control apparatus for an internal combustion engine according to any one of the first to fifth aspects of the present invention, wherein the first crank angle that is set by the absolute pressure correction means is a crank angle at in-cylinder pressure that is higher than a predetermined value.

A seventh aspect of the present invention is the control apparatus for an internal combustion engine according to any one of the first to sixth aspects of the present invention, which further includes mass-fraction-burned calculation means for calculating a mass fraction burned using in-cylinder pressure after correction by the absolute pressure correction means and using the second crank angle as a combustion start point.

Advantageous Effects of Invention

According to the first to third aspects of the present invention, the in-cylinder-pressure-maximum crank angle is obtained. Then, using the in-cylinder-pressure-maximum crank angle as a baseline, the first crank angle and the second crank angle that are used for absolute pressure correction are set as timings in the adiabatic compression stroke. In particular, a crank angle advanced with respect to the in-cylinder-pressure-maximum crank angle is set as the second crank angle in a manner so as to be a timing in the adiabatic compression stroke on the retard side with respect to the spark timing. The second crank angle that is set in this manner is hard to be affected by noise since it is a timing near the compression top dead center. Therefore, the use of such second crank angle can reduce the error of the absolute pressure correction value due to the influence of the noise. In addition, by setting the first crank angle and the second crank angle using, as a baseline, the in-cylinder-pressure-maximum crank angle that can be easily obtained based on the trace of in-cylinder pressure detected by the in-cylinder pressure sensor, the first crank angle and the second crank angle can be obtained while suppressing a number of adaptable processes and an increase in calculation processing load. Furthermore, such method can also avoid a cost increase due to a factor, such as a measure against noise, or a search for high performance of a control apparatus for shortening an interval of obtaining the in-cylinder pressure. As described so far, the present invention can perform the absolute pressure correction that can efficiently suppress the influence of noise with respect to the in-cylinder pressure detected by the in-cylinder pressure sensor, without incurring an increase in cost, a number of adaptable processes, and an increase in calculation processing load.

According to the fourth aspect of the present invention, the first crank angle interval is set based on the difference between the in-cylinder-pressure-maximum crank angle and the spark timing. This makes it possible to properly set the first crank angle interval in accordance with changes in the ignition delay duration from the spark timing to the combustion start point and the main combustion period thereafter, even when slow combustion is performed. In addition, the parameters used in this case are the in-cylinder-pressure-maximum crank angle and the spark timing that are easy to be obtained. Because of this, the first crank angle interval can be properly set without incurring a number of adaptable processes and an increase in calculation processing load.

According to the fifth aspect of the present invention, the second crank angle can be set at a timing that is hard to be affected by the noise since it is a timing near the compression top dead center.

According to the sixth aspect of the present invention, the accuracy of the absolute pressure correction can be prevented from decreasing due to the fact that the in-cylinder pressure at the first crank angle is too low.

According to the seventh aspect of the present invention, the calculation accuracy of the mass fraction burned can be improved not only by a decrease in the influence of the noise due to using the in-cylinder pressure after the correction by the absolute pressure correction means but also by a decrease in the influence of the noise on a heat release amount (or a correction value of the heat release amount) at the combustion start point due to using the second crank angle as the combustion start point.

BRIEF DESCRIPTION OF DRAWINGS

FIG. 1 is a diagram for explaining a system configuration of an internal combustion engine according to a first embodiment of the present invention;

FIGS. 2(A), 2(B), and 2(C) are a diagram that represents a simulation result on the influence of noise superposition on detection values of an in-cylinder pressure sensor;

FIGS. 3(A) and 3(B) are a diagram that represents the influence of an error of absolute pressure correction due to the effect of base noise, on the calculation of a combustion analysis parameter (as one example, combustion center CA50);

FIG. 4 is a diagram for explaining a setting method of a parameter $\alpha$ that is used for the setting of a second crank angle $\theta_2$ in the first embodiment of the present invention;

FIG. 5 is a diagram diagrams that represents the influence (A) of the base noise on the numerator of an absolute pressure correction value $\Delta P$ and a change (B) in magnitude of the denominator of the absolute pressure correction value $\Delta P$, in each relation with a crank angle interval $\Delta \theta$;

FIG. 6 is a diagram that represents the relationship between the degree of variation in the absolute pressure correction value $\Delta P$ due to the influence of the base noise and the crank angle interval $\Delta \theta$;

FIG. 7 is a flowchart of a routine that is executed according to the first embodiment of the present invention;

FIGS. 8(A), 8(B), and 8(C) are a diagram that represents a simulation result on the influence of noise superposition on the detection values of the in-cylinder pressure sensor in applying the absolute pressure correction method according to the first embodiment of the present invention;

FIGS. 9(A) and 9(B) are a diagram that represents a calculation result of the combustion analysis parameter (as one example, combustion center CA50) using the in-cylinder pressure P after correction by the absolute pressure correction method according to the first embodiment of the present invention;

FIG. 10 is a diagram that represents a relationship between 10-90% combustion duration (main combustion duration) and an air-to-fuel ratio (A/F);

FIG. 11 is a diagram that represents a relationship between a parameter ($\theta_{Pmax}$-spark timing) and the 10-90% combustion duration;

FIG. 12 is a diagram that represents the relationship between the parameter α and the parameter ($\theta_{Pmax}$-spark timing) (that is to say, the characteristics of an equation (3));

FIG. 13 is a flowchart of a routine that is executed according to a second embodiment of the present invention;

FIG. 14 is a diagram for explaining a setting method of a first crank angle $\theta_1$ under the combustion in a condition where an intake air rate is small;

FIG. 15 is a flowchart of a routine that is executed according to a third embodiment of the present invention; and FIG. 16 is a flowchart of a routine that is executed according to a fourth embodiment of the present invention.

DESCRIPTION OF EMBODIMENTS

First Embodiment

System Configuration of First Embodiment

FIG. 1 is a diagram for explaining a system configuration of an internal combustion engine 10 according to a first embodiment of the present invention. The system shown in FIG. 1 includes an internal combustion engine (as one example, a spark ignition type internal combustion engine) 10. A piston 12 is provided in a cylinder of the internal combustion engine 10. A combustion chamber 14 is formed on the top side of the piston 12 in the cylinder. There are an intake passage 16 and an exhaust passage 18 in communication with the combustion chamber 14.

An intake port of the intake passage 16 is provided with an intake valve 20 that opens and closes the intake port, and an exhaust port of the exhaust passage 18 is provided with an exhaust valve 22 that opens and closes the exhaust port. Moreover, an electronically controlled throttle valve 24 is installed in the intake passage 16.

There are installed for each cylinder of the internal combustion engine 10, a fuel injection valve 26 for directly injecting fuel into the combustion chamber 14 (cylinder) and a spark plug 28 for igniting an air fuel mixture. Further, an in-cylinder pressure sensor 30 is incorporated in each cylinder to detect in-cylinder pressure P.

Furthermore, the system of the present embodiment includes an ECU (Electronic Control Unit) 40. There are connected to an input section of the ECU 40, various types of sensors for detecting the operational state of the internal combustion engine 10, such as a crank angle sensor 42 for detecting an engine speed, as well as the in-cylinder pressure sensor 30 described above. In addition, there are connected to an output section of the ECU 40, various types of actuators, such as the throttle valve 24, the fuel injection valve 26 and the spark plug 28 that are described above. The ECU 40 executes predetermined engine controls, such as fuel injection control and spark control by actuating the various types of actuators on the basis of the output of each sensor and predetermined programs. Moreover, the ECU 40 has a function of obtaining the output signals of the in-cylinder pressure sensor 30 by analog-digital conversion in synchronization with the crank angle θ. As a result of this, the in-cylinder pressure P at arbitrary timing can be detected within the resolution capability of the analog-digital conversion. In addition, the ECU 40 has a function of calculating, based on the crank angle θ, the value of in-cylinder volume V that is defined depending on the position of the crank angle θ.

Absolute Pressure Correction Method Concerning Detection Values of in-Cylinder Pressure Sensor in First Embodiment (Issues with Securing Accuracy of Absolute Pressure Correction)

Since detection values (outputs) of the in-cylinder pressure sensor are gauge pressure, correction to make them absolute pressure (absolute pressure correction) is typically performed. As a method for performing such absolute pressure correction utilizing the detection values of the in-cylinder pressure sensor 30, for example, a method that utilizes the following equation (1) is known. This method utilizes Poisson's equation ($PV^\kappa$=constant) that holds during a compression stroke that is regarded as the adiabatic process (more specifically, a duration from the closing timing of the intake valve 20 to a start of combustion) to calculate an absolute pressure correction value ΔP based on in-cylinder pressure P and in-cylinder volume V at each of two crank angles in the adiabatic compression stroke and the ratio κ of specific heat.

$$\Delta P=(PV^\kappa(\theta_2)-PV^\kappa(\theta_2-\Delta\theta))/(V^\kappa(\theta_2)-V^\kappa(\theta_2-\Delta\theta)) \quad (1)$$

where in the equation (1), $\theta_2$ is a predetermined second crank angle in the adiabatic compression stroke (described later in detail), Δθ is a predetermined crank angle interval (for example, 30° CA) for two crank angles that are used to perform the absolute pressure correction. Therefore, a first crank angle $\theta_1$ described later is calculated as "$\theta_2-\Delta\theta$".

In the internal combustion engine 10, the absolute pressure correction for the detection values of the in-cylinder pressure sensor 30 with use of the equation (1) is performed for each cycle in each cylinder equipped with the in-cylinder pressure sensor 30 (in a case of the internal combustion engine 10 of the present embodiment, in all cylinders). More specifically, in each cycle, each of output signals of the in-cylinder pressure sensor 30 is obtained by analog-digital conversion in synchronization with the crank angle θ, and thereby, an in-cylinder pressure trace during a predetermined duration (for example, compression stroke and expansion stroke) is obtained and stored in a buffer of the ECU 40. Then, the absolute pressure correction is performed using the two crank angles in the adiabatic compression stroke in the in-cylinder pressure trace that has been obtained, and an in-cylinder pressure trace after the absolute pressure correction is stored in the buffer again. Next, various kinds of combustion analysis parameters (for example, heat release amount Q (or parameter $PV^\kappa$ correlated with the heat release amount Q), mass fraction burned MFB, combustion center CA50 (a crank angle at mass fraction burned MFB 50%), and indicated torque) in the current cycle are calculated using the in-cylinder pressure trace after absolute pressure correction, and the various kinds of combustion analysis parameters that has been calculated are fed back to combustion control in the next cycle.

The accuracy of calculation of the aforementioned combustion analysis parameters and the accuracy of absolute pressure correction in each cycle are highly required especially in supercharged lean-burn combustion, combustion with large amount of EGR gas and HCCI (Homogeneous Charge Compression Ignition) combustion recently under research and development, and ignition startup control. On the other hand, noise (base noise) may be superimposed on the in-cylinder pressure sensor 30, the ECU 40, wire harnesses that connect the in-cylinder pressure sensor 30 with the ECU 40, and the like. When such electro-magnetic noise is superimposed on the detection values of the in-cylinder pressure sensor 30, an error occurs in the calculation of the absolute pressure correction value using the above described method. This noise brings about a large error with respect to a combustion analysis parameter (for example, combustion center CA50 or indicated torque) especially during a low-load combustion. If such error is produced, there is a concern that fuel efficiency and drivability may become unable to be improved as required.

FIGS. 2(A), 2(B), and 2(C) are a diagram that represents a simulation result on the influence of noise superposition on detection values of the in-cylinder pressure sensor 30. More specifically, FIG. 2(A) represents an in-cylinder pressure trace that is obtained by superimposing white noise equivalent to the aforementioned base noise on an in-cylinder pressure trace on which any noise is not superimposed. FIGS. 2(B) and 2(C) represent a parameter $PV^\kappa$ trace and an MFB trace, respectively, which are calculated utilizing in-cylinder pressure P after the absolute pressure correction that uses two points shown by black circles in FIG. 2(A) and the equation (1). The parameter $PV^\kappa$ is a parameter that is highly correlated with the heat release amount Q in the cylinder, and the trace of heat release amount Q becomes similar to the one shown in FIG. 2(B) even when calculating the heat release amount Q by using an equation (2) described later instead of the parameter $PV^\kappa$. It is noted that in each of FIGS. 2(A), 2(B), and 2(C), the trace shown by an solid line denotes a trace without noise and that a range represented around the trace shown by the solid line denotes a variation in value due to the influence of the noise.

Crank angles at timings that can avoid the influence of the closing timing of the intake valve and ignition noise in all operational conditions, such as two points shown by the black circles in FIG. 2(A) (fixed values (for example, 90° CA and 75° CA before the compression top dead center)), have been conventionally used to simplify the calculation processing of an absolute pressure correction. As described above, the equation (1) is derived on the premise that the parameter $PV^\kappa$ is constant in the adiabatic compression stroke and that even if any two points are used, an absolute pressure correction value $\Delta P$ for an identical cycle becomes constant. Because of this, it can be said that there is essentially no problem even if an absolute pressure correction is performed using the two points that are set by use of, for example, the aforementioned prior method.

However, the error of the absolute pressure correction value $\Delta P$ due to the influence of the base noise becomes larger as the gap between the crank angles used for the absolute pressure correction and the compression top dead center increases more. This is because equivalent base noise is superimposed on the in-cylinder pressure P regardless of timing as shown in FIG. 2(A), and on the other hand, the influence of the base noise on the parameter $PV^\kappa$ that is a product of the κth power of the in-cylinder volume V and the in-cylinder pressure P is amplified with an increase in the distance from the compression top dead center as shown in FIG. 2(B) due to the fact that the value of the in-cylinder volume V increases with an increase in the distance from the compression top dead center. The two points that are set by using the aforementioned prior method are crank angles actually at timing that are separated widely from the compression top dead center, and are highly affected by the base noise. As a result, a large error occurs in the absolute pressure correction value $\Delta P$ calculated utilizing such two points. Further, as shown in FIGS. 2(B) and 2(C), a large error also occurs in the parameter $PV^\kappa$ (or heat release amount Q) and the mass fraction burned MFB calculated using the absolute pressure correction value $\Delta P$ having such large error.

FIGS. 3(A) and 3(B) are a diagram that represents the influence of an error of the absolute pressure correction due to the effect of the base noise, on the calculation of the combustion analysis parameter (as one example, combustion center CA50). More specifically, FIG. 3(A) represents the trace of the combustion center CA50 calculated in each of predetermined cycles (here, 500 cycles) by use of the in-cylinder pressure P after correction by the absolute pressure correction that uses the two points shown by the black circles in FIG. 2(A) and the aforementioned equation (1). FIG. 3(B) represents a variation of the combustion center CA50 shown in FIG. 3(A) with the use of histogram. FIGS. 3(A) and 3(B) show that the value of the combustion center CA50 calculated in each cycle also fluctuates largely owing to the error in the absolute pressure correction due to the influence of the base noise.

As described above, the reason why the error of the absolute pressure correction increases in the conventional method is to use two points, which are fixed values, in a range in which the influence of the base noise is large (that is, a range in which the ratio of S/N is low), as two points in the adiabatic compression stroke that are used for the calculation of the absolute pressure correction value $\Delta P$. In response, it is conceivable to take the following measure although it is not the one actually used in the present embodiment.

More specifically, if the base noise is superimposed on the in-cylinder pressure trace, the absolute pressure correction value $\Delta P$ fluctuates when calculating the plurality of absolute pressure correction values $\Delta P$ using different combinations of two crank angles in the same cycle. Since the base noise is a noise equivalent to white noise (normal distribution), it is conceivable to take a countermeasure that uses a value that is obtained by calculating N number of absolute pressure correction values $\Delta P$ in the same cycle and performing average processing thereof. This makes it possible to reduce the influence of the base noise on the absolute pressure correction value $\Delta P$ to 1/N. However, there is a problem that the number N of samples of the values $\Delta P$ necessary to perform sufficient average processing becomes unable to be secured depending on the operational condition, such as a condition in which control to close the intake valve late is performed. In addition, a number of adaptable process of maps are required to set each of the crank angles for the calculation of the N number of absolute pressure correction values $\Delta P$ so as to be an appropriated values in accordance with the operational condition. Furthermore, in order to properly secure the number N, it is required to shorten the crank angle interval in obtaining the in-cylinder pressure with the AD conversion, and thereby, an increase in cost, or an increase in calculation processing load is incurred.

On the other hand, it is conceivable alternatively to take a countermeasure that uses a value that is obtained by calculating the absolute pressure correction value $\Delta P$ in each cycle and averaging the calculated values $\Delta P$ of the plurality of cycles. This makes it possible to properly secure the number N necessary to reduce the base noise. However, this measure is unable to be used during transitional operation in which the operational condition is changing so as to be different from that at the last cycle. In addition, since the absolute pressure correction value $\Delta P$ becomes unable to be confirmed in each cycle, it becomes unable to obtain desired combustion analysis parameters in each cycle and reflect the obtained results to combustion control for the next cycle.

Furthermore, it is conceivable alternatively to take a countermeasure for noise in terms of the hardware configuration, such as, the use of shield wires with respect to an in-cylinder pressure sensor, an ECU and wire harnesses that connect therewith, and the use of a structure in which an output circuit of the sensor is separated into a low pressure section and a high pressure section. However, there is a concern that this measure may incur a significant increase in cost, and its advantage is limited.

Characteristic Absolute Pressure Correction Method in First Embodiment

In the present embodiment, in order to be able to efficiently reduce the influence of noise without incurring an increase in cost, a number of adaptable processes, and an increase in calculation processing load, the absolute pressure correction is performed using the following method. That is to say, the absolute pressure correction method of the present embodiment is characterized by the method for obtaining two crank angles (hereinafter, referred to as a "first crank angle $\theta_1$ and second crank angle $\theta_2$") in the adiabatic compression stroke in calculating the absolute pressure correction value $\Delta P$ using the aforementioned equation (1).

More specifically, in the present embodiment, first, a crank angle when the in-cylinder pressure P (the output value of the in-cylinder pressure sensor 30) becomes maximum during the combustion duration (hereinafter, referred to as an "in-cylinder-pressure-maximum crank angle $\theta_{Pmax}$") is obtained based on an in-cylinder pressure trace obtained using the in-cylinder pressure sensor 30. Further, a crank angle advanced with respect to the in-cylinder-pressure-maximum crank angle $\theta_{Pmax}$ by a parameter $\alpha$ so as to be a timing at the adiabatic compression stroke on the retard side with respect to the spark timing is set as the second crank angle $\theta_2$. Furthermore, a crank angle advanced with respect to the second crank angle $\theta_2$ by a predetermined crank angle interval $\Delta\theta$ is set as the first crank angle $\theta_1$. In this way, according to the method of the present embodiment, the first crank angle $\theta_1$ and the second crank angle $\theta_2$ are changed in accordance with the in-cylinder-pressure-maximum crank angle $\theta_{Pmax}$.

FIG. 4 is a diagram for explaining a setting method of the parameter $\alpha$ that is used for the setting of the second crank angle $\theta_2$ in the first embodiment of the present invention.

In the present embodiment, the second crank angle $\theta_2$ is set so as to be a timing on the retard side with respect to the spark timing and equal to or earlier than a combustion start point (a point at which the mass fraction burned MFB starts to rise from 0%). More specifically, in the present embodiment, the second crank angle $\theta_2$ is set near the combustion start point.

As shown in FIG. 4, the in-cylinder-pressure-maximum crank angle $\theta_{Pmax}$ roughly corresponds to a crank angle when the mass fraction burned MFB becomes 90%. A combustion duration of 10-90% mass fraction burned MFB (that is to say, a so-called "main combustion duration") is roughly 30 to 35° CA even if a change in the engine speed is considered. Accordingly, in the present embodiment, in order to set the second crank angle $\theta_2$ at the aforementioned timing, the parameter $\alpha$ is set as a value advanced with respect to the in-cylinder-pressure-maximum crank angle $\theta_{Pmax}$ by a duration obtained by adding a predetermined margin (a duration of about 5° CA and shorter than the main combustion duration) to the 10-90% combustion duration (main combustion duration). It is noted that the parameter $\alpha$ is assumed to be set as a constant fixed value regardless of the operational condition.

Next, a favorable setting of the crank angle interval $\Delta\theta$ will be described. FIG. 5 is a diagram that represents the influence (A) of the base noise on the numerator of the absolute pressure correction value $\Delta P$ and a change (B) in magnitude of the denominator of the absolute pressure correction value $\Delta P$, in each relation with the crank angle interval $\Delta\theta$. FIG. 6 is a diagram that represents the relationship between the degree of variation in the absolute pressure correction value $\Delta P$ due to the influence of the base noise and the crank angle interval $\Delta\theta$.

According to the aforementioned equation (1), the numerator component of the absolute pressure correction value $\Delta P$ is "$PV^\kappa(\theta_2) - PV^\kappa(\theta_2 - \Delta\theta)$". As the crank angle interval $\Delta\theta$ increases more, the distance of the first crank angle $\theta_1$ from the compression top dead center increases more. Therefore, the error of the numerator component is enlarged since as the crank angle interval $\Delta\theta$ increases more, the influence of the base noise on the numerator component of the absolute pressure correction value $\Delta P$ is more amplified as shown in FIG. 5(A). On the other hand, according to the aforementioned equation (1), the denominator component of the absolute pressure correction value $\Delta P$ is "$V^\kappa(\theta_2) - V^\kappa(\theta_2 - \Delta\theta)$". Therefore, the denominator component of the absolute pressure correction value $\Delta P$ increases more on the minus side as the crank angle interval $\Delta\theta$ increases more, as shown in FIG. 5(B).

As represented by FIGS. 5(A) and 5(B), concerning the influence of a change in the crank angle interval $\Delta\theta$ on the absolute pressure correction value $\Delta P$, contribution of an increase in the denominator component (as an absolute value) is larger than that of amplification of the error due to the effect of the base noise of the numerator component of the absolute pressure correction value $\Delta P$. Consequently, it can be said that as shown in FIG. 6, the error (variation) of the absolute pressure correction value $\Delta P$ decreases more as the crank angle interval $\Delta\theta$ increases more. Accordingly, in the present embodiment, the crank angle interval $\Delta\theta$ is set so that the calculation accuracy of the absolute pressure correction value $\Delta P$ falls within a desired accuracy. For example, 30° CA corresponds to such crank angle interval $\Delta\theta$.

FIG. 7 is a flowchart that represents a routine to be executed by the ECU 40 to realize the absolute pressure correction according to the first embodiment of the present invention. It is assumed that the present routine is repeatedly executed at each cylinder in each cycle of the internal combustion engine 10.

In the routine shown in FIG. 7, first, the ECU 40 uses the trace of the output values (AD conversion values) of the in-cylinder pressure sensor 30 to obtain the in-cylinder-pressure-maximum crank angle $\theta_{Pmax}$ that is a crank angle of becoming maximum in the output value (step 100).

Next, the ECU 40 calculates the value that is obtained by subtracting the parameter $\alpha$ from the obtained in-cylinder-pressure-maximum crank angle $\theta_{Pmax}$, as the second crank angle $\theta_2$ (step 102). The parameter $\alpha$ is a fixed value adapted in advance in accordance with the method described already with reference to FIG. 4. According to the processing in step 102, a crank angle advanced with respect to the in-cylinderpressure-maximum crank angle $\theta_{Pmax}$ by the parameter $\alpha$ is calculated as the second crank angle $\theta_2$.

Next, the ECU 40 calculates the value that is obtained by subtracting the crank angle interval $\Delta\theta$ from the calculated second crank angle $\theta_2$, as the first crank angle $\theta_1$ (step 104). The crank angle interval $\Delta\theta$ is a value that is set in advance as the magnitude (for example, 30° CA) that can secure the accuracy of the absolute pressure correction value $\Delta P$, as already described with reference to FIG. 6. According to the processing of step 104, a crank angle advanced with respect to the second crank angle $\theta_2$ by the crank angle interval $\Delta\theta$ is calculated as the first crank angle $\theta_1$.

Next, the ECU 40 calculates the absolute pressure correction value $\Delta P$ in accordance with the aforementioned equation (1) by use of the second crank angle $\theta_2$ and the first crank angle $\theta_1$ that are calculated as described above (step 106).

FIGS. 8(A), 8(B), and 8(C) are a diagram that represents a simulation result on the influence of noise superposition on the detection values of the in-cylinder pressure sensor 30 in applying the absolute pressure correction method according to the first embodiment of the present invention. More specifically, FIG. 8(A) represents an in-cylinder pressure trace that is obtained by superimposing white noise equivalent to the one in FIG. 2(A) on an in-cylinder pressure trace on which any noise is not superimposed. FIGS. 9(A) and 9(B) are a diagram that represents a calculation result of the combustion analysis parameter (as one example, combustion center CA50) using the in-cylinder pressure P after correction by the absolute pressure correction method according to the first embodiment of the present invention.

According to the absolute pressure correction method of the present embodiment which has been described above, the second crank angle $\theta_2$ is set to a timing near the combustion start point. The second crank angle $\theta_2$ that is set as above corresponds to a timing near the compression top dead center. Moreover, a crank angle advanced with respect to the second crank angle $\theta_2$ by the aforementioned crank angle interval $\Delta\theta$ is set as the first crank angle $\theta_1$. Using the second crank angle $\theta_2$ and the first crank angle $\theta_1$ that are set as above can considerably reduce the error of the absolute pressure correction value $\Delta P$ due to the influence of the base noise.

Consequently, as shown in FIGS. 8(B) and 8(C), the noise superimposed on each trace of the parameter $PV^\kappa$ (the same also applies with respect to the trace of the heat release amount Q) and the mass fraction burned MFB that are calculated utilizing the in-cylinder pressure P after the absolute pressure correction by the aforementioned method can be considerably reduced. Further, as shown in FIGS. 9(A) and 9(B), the noise superimposed on the combustion center CA50 that is calculated utilizing the in-cylinder pressure P after the absolute pressure correction by the aforementioned method can be considerably reduced. As described above, by utilizing the in-cylinder pressure P after the absolute pressure correction by the aforementioned method, various combustion analysis parameters can be calculated with a high degree of accuracy. As a result, in the engine controls based on the detection values of the in-cylinder pressure sensor 30, fuel efficiency and drivability can be controlled as required.

Moreover, no preliminary calculation is required to obtain the in-cylinder-pressure-maximum crank angle $\theta_{Pmax}$. More specifically, the in-cylinder-pressure-maximum crank angle $\theta_{Pmax}$ can be easily detected, for example, by only obtaining the output values (AD conversion values) of the in-cylinder pressure sensor 30 while utilizing a peak hold function that stores its maximum value. In addition, no special calculation processing load is required since the second crank angle $\theta_2$ advancing by the parameter $\alpha$ that is previously set and the first crank angle $\theta_1$ advancing from the second crank angle $\theta_2$ by the predetermined crank angle interval $\Delta\theta$ are calculated on the basis of the in-cylinder-pressure-maximum crank angle $\theta_{Pmax}$ easily obtainable as described above.

Moreover, the above described calculation of the first crank angle $\theta_1$ and the second crank angle $\theta_2$ based on the in-cylinder-pressure-maximum crank angle $\theta_{Pmax}$ is performed in each cycle, and thereby, appropriate two points ($\theta_1$ and $\theta_2$) can be calculated regardless of the operational condition. Therefore, an increase of adaptable process can be also suppressed since it is not required to have a map for each operational condition for the calculation of these two points ($\theta_1$ and $\theta_2$).

Furthermore, there is a concern that cost may increase due to, for example, complication of a sensor circuit (such as, division into two sections of a low pressure section and a high pressure section, or addition of a large-capacity capacitor), shielding of wire harnesses, or complication of an ECU circuit when taking a measure for noise in terms of the hardware configuration. However, according to the absolute pressure correction method, the error of the absolute pressure correction value $\Delta P$ due to the influence of the base noise can be reduced without incurring such cost increase.

As described above, according to the absolute pressure correction method of the present embodiment, the absolute pressure correction of the detection values of the in-cylinder pressure sensor 30 can be performed while efficiently suppressing the influence of noise, without incurring an increase in cost, a number of adaptable processes, and an increase in calculation processing load.

Meanwhile, in the first embodiment, which has been described above, a crank angle advanced with respect to the in-cylinder-pressure-maximum crank angle $\theta_{Pmax}$ by the parameter $\alpha$ is set as the second crank angle $\theta_2$, and a crank angle advanced with respect to the second crank angle $\theta_2$ by the crank angle interval $\Delta\theta$ is set as the first crank angle $\theta_1$. However, the setting method of the first crank angle and the second crank angle in the present invention is not limited to the one described above. That is to say, a crank angle advanced with respect to the in-cylinder-pressure-maximum crank angle $\theta_{Pmax}$ by a predetermined crank angle interval (which corresponds to a "third crank angle interval" in the present invention) may be set as the first crank angle $\theta_1$, and a crank angle retarded with respect to the first crank angle $\theta_1$ by the aforementioned crank angle interval $\Delta\theta$ may be set as the second crank angle $\theta_2$. Alternatively, a crank angle advanced with respect to the in-cylinder-pressure-maximum crank angle $\theta_{Pmax}$ by a predetermined crank angle interval (as a matter of convenience, referred to as a "fourth crank angle interval") may be set as the first crank angle $\theta_1$, and a crank angle advanced with respect to the in-cylinder-pressure-maximum crank angle $\theta_{Pmax}$ by a predetermined crank angle interval (as a matter of convenience, referred to as a "fifth crank angle interval") smaller than the fourth crank angle interval may be set as the second crank angle $\theta_2$.

Moreover, in the first embodiment, a description has been made as one example such that the second crank angle $\theta_2$ is set to a crank angle on the advance side of the compression top dead center and the first crank angle $\theta_1$ is set to a crank angle on the advance side with respect to the spark timing, as shown in FIG. 8(A) and the like. However, the second crank angle $\theta_2$ in the present invention may be arbitrarily set in accordance with the in-cylinder-pressure-maximum crank angle, provided that it is a timing that is on the retard side with respect to the spark timing and equal to or earlier than the combustion start point. In addition, the first crank angle $\theta_1$ in the present invention may be set to a crank angle on the retard side with respect to the spark timing, provided that it is a crank angle advanced with respect to the second crank angle $\theta_2$ by a predetermined crank angle interval.

Moreover, in the first embodiment, a description has been made taking as an example the absolute pressure correction method utilizing the parameter $PV^\kappa$ that is directly correlated with the heat release amount Q in the cylinder. However, in the present invention, the absolute pressure correction value calculated using the first crank angle and the second crank angle in the adiabatic compression stroke may be calculated using the heat release amount Q in the cylinder. It is noted that the heat release amount Q can be calculated with the following equation (2). More specifically, the heat release amount Q can be calculated by integrating, with respect to the crank angle $\theta$, the heat release rate $dQ/d\theta$ in the cylinder that can be calculated utilizing the detection values of the in-cylinder pressure sensor 30.

$$\theta = \int (dQ/d\theta) d\theta = \int (1/(\kappa-1)\times(VdP/d\theta + p\kappa dV/d\theta)) d\theta \qquad (2)$$

It is noted that in the first embodiment which has been described above, the ECU 40 executes the processing of step 100, whereby the "obtaining means" according to the first aspect of the present invention is realized; and the ECU 40 executes the processing of steps 102 to 106, whereby the "absolute pressure correction means" according to the first aspect of the present invention is realized. In addition, in the first embodiment, the parameter $\alpha$ corresponds to the "first crank angle interval" according to the second aspect of the present invention; and the crank angle interval $\Delta\theta$ corresponds to the "second crank angle interval" according to the second aspect of the present invention.

Second Embodiment

Next, a second embodiment of the present invention will be described mainly referring to FIGS. 10 to 13.

The system of the present embodiment can be implemented by using the hardware configuration shown in FIG. 1 and causing the ECU 40 to execute the routine shown in FIG. 13 described below, instead of the routine shown in FIG. 7.

During operation of the internal combustion engine 10, slow combustion in which burning velocity is lower than that of normal combustion, such as lean-burn combustion, combustion with large amount of EGR gas, or retarded combustion for the warm up of a catalyst may be performed. In such slow combustion, the ignition timing (combustion start point) is retarded (ignition delay duration elongates). In addition, when the ignition timing is retarded due to the slow combustion, the main combustion duration (10-90% combustion duration) also elongates. FIG. 10 is a diagram that represents a relationship between the 10-90% combustion duration (main combustion duration) and the air-to-fuel ratio (A/F). Taking as an example the air-to-fuel ratio, as the air-to-fuel ratio is leaner with respect to the stoichiometric air-to-fuel ratio, the burning velocity slows down and the 10-90% combustion duration elongates as shown in FIG. 10.

If the second crank angle $\theta_2$ is calculated using the parameter $\alpha$ that was set for the condition in which the normal combustion is performed (for example, in which the air-to-fuel ratio is stoichiometric) even though the ignition delay duration and the main combustion duration have been changed due to the slow combustion as described above, a crank angle after the combustion already started (that is to say, a crank angle in a duration that is not the adiabatic compression stroke) may be selected as the second crank angle $\theta_2$. As a result of this, there is a concern that an error may occur in the absolute pressure correction value $\Delta P$.

Accordingly, in the present embodiment, in order to be able to properly identify the parameter $\alpha$ regardless of changes in the ignition delay duration and the main combustion duration (i.e. burning velocity), the parameter $\alpha$ is calculated in each cycle in accordance with the following equation (3).

$$\alpha = k \times (\theta_{Pmax} - \text{spark timing}) \qquad (3)$$

where the coefficient k in the equation (3) is an adapted value (positive value).

FIG. 11 is a diagram that represents a relationship between the parameter ($\theta_{Pmax}$-spark timing) and the 10-90% combustion duration. FIG. 12 is a diagram that represents the relationship between the parameter $\alpha$ and the parameter ($\theta_{Pmax}$-spark timing) (that is to say, the characteristics of the equation (3)).

The parameter ($\theta_{Pmax}$-spark timing) is defined as a duration including: the ignition delay duration from spark (electric discharge) to ignition (start of combustion); and the main combustion duration (10-90% combustion duration) thereafter. It is therefore found that as shown in FIG. 11, the parameter ($\theta_{Pmax}$-spark timing) is correlated with the 10-90% combustion duration. In addition, it is found that according to the relationships shown in FIGS. 10 and 11, the parameter ($\theta_{Pmax}$-spark timing) is also correlated with the air-to-fuel ratio that is a parameter that affects the ignition delay duration and the main combustion duration. Although the detailed explanation is omitted here, it can be said that as with the air-to-fuel ratio, the parameter ($\theta_{Pmax}$-spark timing) is correlated also with parameters that affect the ignition delay duration and the main combustion duration, such as the amount of EGR gas and the intake valve timing other than the air-to-fuel ratio. Accordingly, in the present embodiment, as the parameter ($\theta_{Pmax}$-spark timing) becomes larger, the parameter $\alpha$ for identifying the second crank angle $\theta_2$ is more enlarged with the relationship of the equation (3), as shown in FIG. 12.

According to the relationship shown in FIG. 12, the parameter ($\theta_{Pmax}$-spark timing) becomes longer than that of the normal combustion when, for example, the slow combustion with an air-to-fuel ratio leaner than that at the normal combustion (stoichiometric air-to-fuel ratio) is performed. Due to this, the parameter $\alpha$ is set to a value larger than that at the normal combustion. More specifically, the parameter $\alpha$ becomes larger as the air-to-fuel ratio becomes leaner with respect to the stoichiometric air-to-fuel ratio. Identifying the parameter $\alpha$ as above by using the relationship shown in FIG. 12 makes it possible to calculate the parameter $\alpha$ that is suitable for the current combustion in each cycle, while reflecting the influence of the parameters that affect the ignition delay duration and the main combustion duration, such as the air-to-fuel ratio, the amount of EGR gas and the intake valve timing, without the need of calculating the parameters.

Consequently, even when the ignition delay duration and the main combustion duration change due to performance of the slow combustion, such as the lean-burn combustion, the second crank angle $\theta_2$ can be set so as to be surely a crank angle in the adiabatic compression stroke, and the calculation accuracy of the absolute pressure correction value $\Delta P$ can be enhanced as compared with the above described first embodiment. In addition, the parameter $\alpha$ that is calculated as above is applicable with respect to all operational conditions, and an increase of adaptable processes can be avoided in identifying an appropriate parameter α in accordance with the ignition delay duration and the main combustion duration.

Furthermore, in the above described method, the parameter ($\theta_{Pmax}$-spark timing) is used instead of the 10-90% combustion duration when calculating the parameter α. The 10-90% combustion duration is a value calculated after the mass fraction burned MFB is calculated using the detection values of the in-cylinder pressure sensor 30, and it is therefore required to use the values of the in-cylinder pressure P obtained by performing the absolute pressure correction in order to obtain the values with a high degree of accuracy. Because of this, in calculating the parameter α used for the absolute pressure correction, it is not appropriate to use the 10-90% combustion duration in a state in which the absolute pressure correction has not been performed. On the other hand, according to the present embodiment, the parameter α can be appropriately calculated on the basis of the parameter ($\theta_{Pmax}$-spark timing) that is not affected according to whether or not the absolute pressure correction is performed. In addition, the parameter ($\theta_{Pmax}$-spark timing) uses not only the spark timing but also the in-cylinder-pressure-maximum crank angle $\theta_{Pmax}$ that can be easily obtained using, for example, a peak hold function as already described in the first embodiment. Therefore, the parameter α in accordance with the ignition delay duration and the main combustion duration can be calculated in each cycle without incurring an increase in calculation processing load.

FIG. 13 is a flowchart that represents a routine to be executed by the ECU 40 to realize the absolute pressure correction according to the second embodiment of the present invention. In FIG. 13, steps that are the same as steps shown in FIG. 7 according to the first embodiment are denoted by the same reference numerals, and a description of those steps is omitted or simplified.

In the routine shown in FIG. 13, after calculating the in-cylinder-pressure-maximum crank angle $\theta_{Pmax}$ in step 100, the ECU 40 calculates the parameter α on the basis of the parameter ($\theta_{Pmax}$-spark timing), in accordance with the aforementioned equation (3) (step 200). It is noted that in the present embodiment, an adapted value that was set in advance is used as the coefficient k in the equation (3).

According to the routine shown in FIG. 13 which has been described above, the parameter α in accordance with the ignition delay duration and the main combustion duration can be calculated in each cycle without incurring an increase of adaptable processes and an increase in calculation processing load as already described.

Third Embodiment

Next, a third embodiment of the present invention will be described mainly referring to FIGS. 14 and 15.

The system of the present embodiment can be implemented by using the hardware configuration shown in FIG. 1 and causing the ECU 40 to execute the routine shown in FIG. 15 described below, instead of the routine shown in FIG. 13.

FIG. 14 is a diagram for explaining a setting method of the first crank angle $\theta_1$ under the combustion in a condition where the intake air rate is small. Under a condition where the intake air rate is small, that is to say, at the time of a low load operation, the in-cylinder pressure P is hard to increase during the compression stroke. Because of this, when the crank angle interval Δθ is set on the basis of the ideas already described with reference to FIG. 6, the in-cylinder pressure P($\theta_1$) at the first crank angle $\theta_1$ may become too low. If the in-cylinder pressure P($\theta_1$) is low, this in-cylinder pressure P($\theta_1$) is easy to be affected by noise. Therefore, there is a concern that the error of the absolute pressure correction value ΔP may increase.

Accordingly, in the present embodiment, if the in-cylinder pressure P($\theta_1$) at the first crank angle $\theta_1$ that is obtained by subtracting the crank angle interval Δθ from the second crank angle $\theta_2$ is lower than or equal to a predetermined determination value $P_{min}$ (for example, 0.4 MPa) when calculating the first crank angle $\theta_1$, a corrected value Δθ' of the crank angle interval for causing a crank angle at a timing where the in-cylinder pressure P is slightly higher than the determination value $P_{min}$ to be the first crank angle $\theta_1$ is calculated as shown in FIG. 14.

In addition, in the present embodiment, when performing the processing to correct the crank angle interval Δθ to Δθ' as described above, an operational condition (mainly, intake air rate) in performing this processing is learned in association with Δθ'. On that basis, when the same operational condition is arrived at or after the next cycle, a corrected crank angle interval Δθ ' is obtained to calculate the first crank angle $\theta_1$.

FIG. 15 is a flowchart that represents a routine to be executed by the ECU 40 to realize the absolute pressure correction according to the third embodiment of the present invention. In FIG. 15, steps that are the same as steps shown in FIG. 13 according to the second embodiment are denoted by the same reference numerals, and a description of those steps is omitted or simplified.

In the routine shown in FIG. 15, after calculating the first crank angle $\theta_1$ in step 104, the ECU 40 determines whether or not the in-cylinder pressure P($\theta_1$) at the first crank angle $\theta_1$ is higher than the aforementioned determination value $P_{min}$ (step 300). If, as a result, the determination result of step 300 is positive, the ECU 40 immediately proceeds to step 106 to calculate the absolute pressure correction value ΔP.

If, on the other hand, the determination result of step 300 is negative, that is to say, if there is a concern that the error of the absolute pressure correction value ΔP may increase due to the fact that the in-cylinder pressure P($\theta_1$) is too low, the ECU 40 determines whether or not the learning has been done at the same operational condition (mainly, intake air rate (load factor KL) condition) as the operational condition of the current processing cycle (step 302).

As a result of that, in a case of an operational condition where the learning has not been performed yet, the ECU 40 calculates the correction value Δθ' of the crank angle interval for causing a crank angle at a timing where the in-cylinder pressure P is slightly higher than the determination value $P_{min}$ to be the first crank angle $\theta_1$, and holds the current operational condition as a learned value in association with the corrected value Δθ' (step 304). In this case, the ECU 40 calculates the first crank angle $\theta_1$ as a value that is obtained by subtracting the corrected crank angle interval Δθ' from the second crank angle $\theta_2$ (step 306).

If, on the other hand, it is determined in step 302 that the learning has been already done, the ECU 40 obtains the crank angle interval Δθ ' that was previously calculated under the same operational condition as that at the current processing cycle (step 308) and proceeds to step 306.

According to the routine shown in FIG. 15 which has been described above, when the in-cylinder pressure P($\theta_1$) at the first crank angle $\theta_1$ is lower than or equal to the determination value $P_{min}$ during the low load operation, a crank angle at a timing where the in-cylinder pressure P is slightly higher than the determination value $P_{min}$ is corrected to be the first crank angle $θ_1$. This can prevent the error of the absolute pressure correction value ΔP from increasing due to the fact that the in-cylinder pressure $P(θ_1)$ at the first crank angle $θ_1$ is too low.

Furthermore, according to the aforementioned routine, when performing the processing to correct the crank angle interval Δθ to Δθ', the operational condition when this processing has been done is learned in association with the corrected value Δθ', and the corrected value Δθ' is used when the same operational condition is arrived at or after the next cycle. As a result of this, the corrected value Δθ' of the crank angle interval Δθ that is suitable for each of the operational condition is no longer necessary to be adapted in advance and installed. Therefore, adaptable processes can be reduced.

Fourth Embodiment

Next, a fourth embodiment of the present invention will be described mainly referring to FIG. 16.

The system of the present embodiment can be implemented by using the hardware configuration shown in FIG. 1 and causing the ECU 40 to execute the routine shown in FIG. 16 described below, instead of the routine shown in FIG. 13.

The mass fraction burned MFB at an arbitrary crank angle θ can be calculated in accordance with the following equation (4) using the parameter $PV^κ$ that is correlated with the heat release amount Q in a cylinder.

$$MFB = (PV^κ(θ) - PV^κ(θ_{sta}))/(PV^κ(θ_{fin}) - PV^κ(θ_{sta})) \quad (4)$$

where in the equation (4), $θ_{sta}$ is a combustion start point (combustion start timing), and $θ_{fin}$ is a combustion end point (combustion end timing). It is noted that the mass fraction burned MFB can also be calculated using the heat release amount Q that can be calculated using the aforementioned equation (2) instead of the parameter $PV^κ$.

When the mass fraction burned MFB is conventionally calculated, a crank angle that is away from the compression top dead center has been typically used as the combustion start point $θ_{Psta}$ to simplify calculation processing, as with the one already described as issues on the calculation of the absolute pressure correction value ΔP with reference to the black circles in FIG. 2(A).

By using the in-cylinder pressure P after correction by the absolute pressure correction method according to the above described first embodiment or the like, the trace of the parameter $PV^κ$ in which the influence of the base noise has been largely reduced can be obtained as seen from the comparison between FIG. 8(B) and FIG. 2(B). However, as seen from FIG. 8(B), in the trace of the parameter $PV^κ$, the influence of the base noise remains at crank angles that are largely away from the compression top dead center although it is low level. Because of this, in a case in which the mass fraction burned MFB is calculated by calculating the parameter $PV^κ$ (the same also applies with respect to the trace of the heat release amount Q) based on the in-cylinder pressure P after correction by the absolute pressure correction method according to the first embodiment or the like, if crank angles that are largely away from the compression top dead center are used as the combustion start point $θ_{Psta}$ as in the conventional method, the accuracy of calculation of the mass fraction burned MFB deteriorates.

Accordingly, in the present embodiment, the aforementioned second crank angle $θ_2$ that is calculated as a crank angle advanced with respect to the in-cylinder-pressure-maximum crank angle $θ_{Pmax}$ by the parameter α is used as the combustion start point $θ_{sta}$ in a case in which the mass fraction burned MFB is calculated using the in-cylinder pressure P after correction by the absolute pressure correction method according to the first embodiment or the like.

FIG. 16 is a flowchart that represents a routine to be executed by the ECU 40 to realize the calculation of the mass fraction burned MFB according to the fourth embodiment of the present invention. In FIG. 16, steps that are the same as steps shown in FIG. 13 according to the second embodiment are denoted by the same reference numerals, and a description of those steps is omitted or simplified. Although the calculation processing of the mass fraction burned MFB in the present embodiment is combined with the absolute pressure correction method described in the second embodiment, it may be executed in combination with the absolute pressure correction method described in the first or three embodiment.

In the routine shown in FIG. 16, after calculating the absolute pressure correction value ΔP in step 106, the ECU 40 sets the second crank angle $θ_2$ that is calculated in step 102 as the combustion start point $θ_{sta}$ that is used in the aforementioned equation (4), and then calculates the mass fraction burned MFB in accordance with the equation (4) (step 400). It is noted that the combustion end point $θ_{fin}$ in the equation (4) can be obtained as a crank angle when the parameter $PV^κ$ calculated using the in-cylinder pressure P after the absolute pressure correction becomes maximum. Next, the ECU 40 calculates the combustion center CA50 as a combustion analysis parameter that is obtained utilizing the calculation values of the mass fraction burned MFB (step 402).

According to the routine shown in FIG. 16 which has been described above, the influence of the base noise on the $PVκ(θ_{sta})$ that is a correlation value of the heat release amount at the combustion start point $θ_{sta}$ can be reduced by calculating the mass fraction burned MFB using, as the combustion start point $θ_{sta}$, the second crank angle $θ_2$ that is calculated using the in-cylinder-pressure-maximum crank angle $θ_{Pmax}$ as a baseline. As described above, the calculation accuracy of the mass fraction burned MFB can be further improved by using the absolute pressure correction value ΔP in which the influence of the base noise has been largely reduced and by using the second crank angle $θ_2$ as the combustion start point $θ_{sta}$.

It is noted that in the fourth embodiment which has been described above, the ECU 40 executes the processing of step 400, whereby the "mass-fraction-burned calculation means" according to the seventh aspect of the present invention is realized.

DESCRIPTION OF SYMBOLS 10 internal combustion engine
12 piston
14 combustion chamber
16 intake passage
18 exhaust passage
20 intake valve
22 exhaust valve
24 throttle valve
26 fuel injection valve
28 spark plug
30 in-cylinder pressure sensor
40 ECU (Electronic Control Unit)
42 crank angle sensor

The invention claimed is:

1. A control apparatus for an internal combustion engine, comprising:
    an in-cylinder pressure sensor detecting in-cylinder pressure; and
    a processor with an input section configured to receive input from the in-cylinder pressure sensor, the processor programmed to:
    obtain an in-cylinder-pressure-maximum crank angle when in-cylinder pressure detected by the in-cylinder pressure sensor becomes maximum during a combustion duration; and
    set, using the in-cylinder-pressure-maximum crank angle as a baseline, a first crank angle and a second crank angle on a retard side of the first crank angle in an adiabatic compression stroke from a closing timing of an intake valve until a start of combustion and, based on in-cylinder pressure and in-cylinder volume at each of the first crank angle and the second crank angle, perform absolute correction for the in-cylinder pressure detected by the in-cylinder pressure sensor,
    wherein the second crank angle that is set by the processor is a crank angle advanced with respect to the in-cylinder-pressure-maximum crank angle in a manner so as to be a timing in the adiabatic compression stroke on a retard side with respect to the spark timing, and is used for the absolute correction.

2. The control apparatus for an internal combustion engine according to claim 1,
    wherein the second crank angle that is set by the processor is a crank angle advanced with respect to the in-cylinder-pressure-maximum crank angle by a first crank angle duration, and the first crank angle that is set by the processor is a crank angle advanced with respect to the second crank angle by a second crank angle duration.

3. The control apparatus for an internal combustion engine according to claim 1,
    wherein the first crank angle that is set by the processor is a crank angle advanced with respect to the in-cylinder-pressure-maximum crank angle by a third crank angle duration, and the second crank angle that is set by the processor is a crank angle retarded with respect to the first crank angle by a second crank angle duration.

4. The control apparatus for an internal combustion engine according to claim 2,
    wherein the processor sets the first crank angle duration based on a difference between the in-cylinder-pressure-maximum crank angle and a spark timing.

5. The control apparatus for an internal combustion engine according to claim 1,
    wherein the second crank angle that is set by the processor is a crank angle near a combustion start point.

6. The control apparatus for an internal combustion engine according to claim 1,
    wherein the first crank angle that is set by the processor is a crank angle that is associated with an in-cylinder pressure that is higher than a predetermined in-cylinder pressure value.

7. The control apparatus for an internal combustion engine according to claim 1,
    wherein the processor is further programmed to calculate a mass fraction burned using in-cylinder pressure after correction by the processor and using the second crank angle as a combustion start point.

* * * * *